R. W. DULL.
LINK BELT.
APPLICATION FILED JULY 11, 1919.
1,411,994.
Patented Apr. 4, 1922.
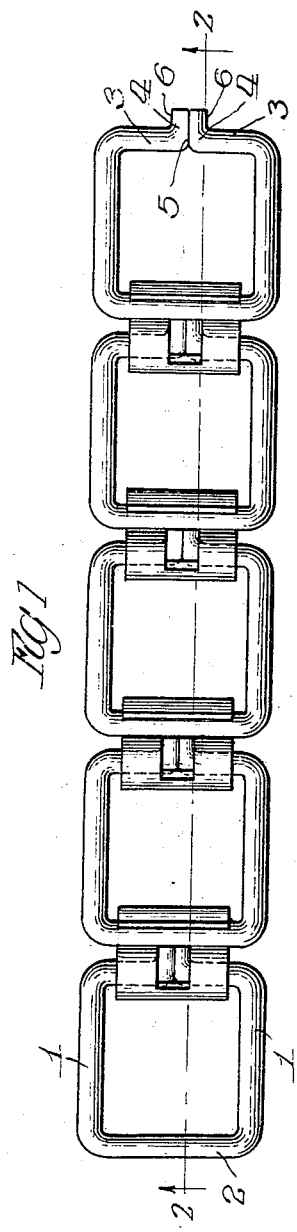
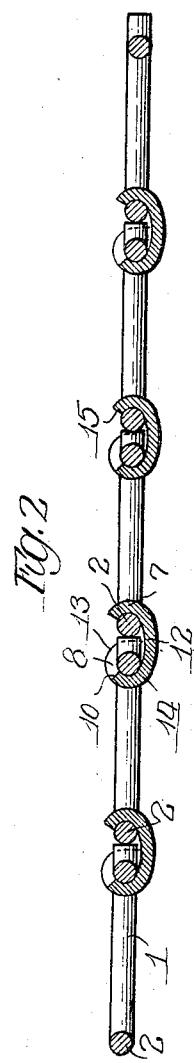
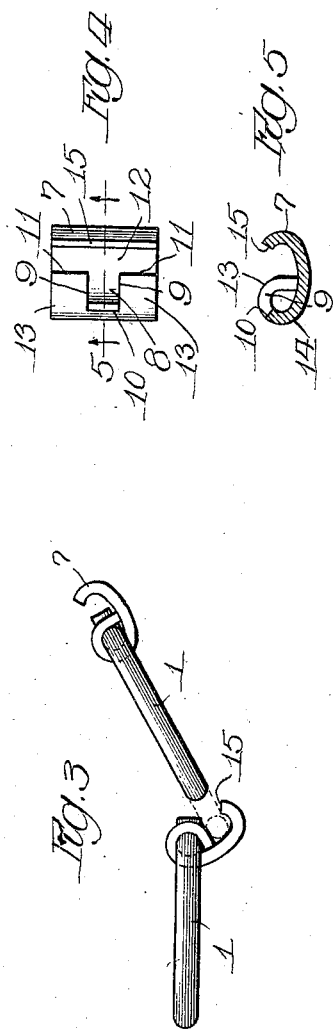
Inventor,
R. W. Dull.
By Arthur R. Durand
Atty.

UNITED STATES PATENT OFFICE.

RAYMOND W. DULL, OF LA GRANGE, ILLINOIS.

LINK BELT.

1,411,994.             Specification of Letters Patent.        Patented Apr. 4, 1922.

Application filed July 11, 1919. Serial No. 310,018.

*To all whom it may concern:*

Be it known that I, RAYMOND W. DULL, a citizen of the United States of America, and a resident of La Grange, Illinois, have invented a certain new and useful Improvement in Link Belts, of which the following is a specification.

This invention relates to link belts of the kind shown and described and claimed in application No. 305,551, filed June 20, 1919, and is in the nature of an improvement thereon. In said prior application, each sheet metal link is capable of pivotal motion relatively to one of the links made from wires or rods, but at its other end each sheet metal link is locked against movement relatively to the link connected thereto; so that each sheet metal link has a pivotal connection at one end only.

The object of the present invention, as hereinafter described, is to provide a construction and arrangement whereby each sheet metal link provides a pivotal connection at both ends thereof, so that by relative adjustment of the links, as by moving of one sheet metal link about a transverse axis relatively to the link connected thereto, one link may be released from another, thus permitting the chain or link belt to be opened and permitting the removal of links for the purpose of repair or substitution.

It is also an object to provide certain details and features of construction tending to increase the general efficiency and the desirability of a link belt of this particular character.

To these and other useful ends the invention consists in matters hereinafter set forth and claimed and shown in the accompanying drawings, in which—

Fig. 1 is a plan of a portion of a link belt embodying the principles of the invention.

Fig. 2 is a longitudinal section on line 2—2 in Fig. 1.

Fig. 3 is a detail view illustrating the manner in which the links are relatively adjusted in order to permit the release of one link from another.

Fig. 4 is a plan of one of the sheet metal or intermediate links.

Fig. 5 is a section on line 5—5 in Fig. 4.

As thus illustrated, the invention comprises a series of alternate links made from wires or rods, each link having side portions 1—1, a continuous transverse end portion 2, and transverse end portions 3—3 which are formed with outwardly bent ends 4 which are preferably brought close together to provide a tight joint 5 between them.

In this way shoulders 6 are formed at opposite sides of the joint 5 by the outturned end portions of the wire or rod from which each alternate link is made. The intermediate links are formed from sheet metal and are preferably narrower than the alternate links, being each provided with a curled portion 7 for engaging the end portion 2 of one of the alternate links. Each intermediate link is also provided at its other end with a notch 8 having side edges 9 that engage the shoulders 6 previously mentioned, thus preventing the joint 5 from spreading or opening while the chain is under strain. This notch 8 preferably has its end edge 10 located a distance from the end portions 4 of the alternate link, and the end edges 11 at each side of the notch 8 preferably bear against the bottom surface 12 of the sheet metal link, so that the portions 3 are not removable from the pivotal bearing thus formed by the portions 13 and the portion 14 of the sheet metal link. The depth of the notch 8, however, is such that the end portions 4 can rise in the notch and swing upward until the alternate link stands at right angles to the sheet metal or intermediate link; or, as shown in Fig. 3, the sheet metal link can swing downward at one end until the edge 10 of the notch 8 bears upon the portions 4 of the link which is made from a length of wire or rod. The end portions 4 project a little beyond the end portions 13, it will be seen, and thereby engage the portion 2 of the alternate link, thus holding the portion 2 firmly seated within the curled portion 7 of the sheet metal link, and preventing separation of the two links. However, when the links are relatively adjusted, in the manner stated, so that the portions 4 are disengaged from the portion 2, the latter is then removable from the sheet metal link, as the distance between the edge 15 of the portion 7 and the outer surface of the portions 13 is a little greater than the diameter of the portion 2, thus permitting the latter to pass outwardly and be disengaged from the sheet metal link.

From the foregoing it will be seen that the link belt is advantageously composed of alternate links made from wires or rods which are very strong, and intermediate links which are advantageously made from sheet metal blanks bent into the desired form, it being understood that each sheet metal link is first cut in blank form from the sheet metal, and is thereafter bent around the alternate links. At the same time, however, and notwithstanding the capacity of the intermediate links to prevent the joints 5 of the alternate links from spreading or opening, it will be seen that the relative formation of the links is such that a pivotal connection is provided at both ends of each intermediate link, so that when the chain or belt travels around a sprocket wheel each alternate link will have a pivotal action at opposite ends thereof, there being a point of articulation, so to speak, wherever an alternate link engages an intermediate link. This, in addition, and by reason of the manner in which the end portions 4 normally hold the portions 2 properly seated in the portions 7, serves also to permit disengagement of one link from another by simply relatively adjusting the alternate link and the intermediate link until the end portions 4 are disengaged from the portion 2 of the next alternate link, in the manner explained. Hence it is unnecessary to notch or indent the alternate links for the purpose of permitting separation of the links, this separation being accomplished by merely relatively adjusting the links about a transverse axis, in the manner shown and described.

What I claim as my invention is:—

1. In a link belt, the combination of alternate links formed from rods or wires bent to provide open links of general rectangular form, and intermediate links of sheet metal bent to engage the transverse end portions of said alternate links, thereby to form a chain of articulated links which constitute the belt, one or more of said alternate links having a joint formed where the ends of the rod or wire are brought together, and one or more of the intermediate links having a portion inserted between the adjacent ends of intermediate links and formed with a notch to receive the out-turned ends of the rod or wire, thereby to keep the joint from spreading or opening when the belt is under strain, said notch permitting relative adjustment between the links to release one link from another.

2. In a link belt the combination of alternate links formed from rods or wires bent to provide open links of general rectangular form, and intermediate links of sheet metal bent to engage the transverse end portions of said alternate links, thereby to form a chain of articulated links which constitute the belt, one or more of said alternate links having a joint formed where the ends of the rod or wire are brought together, and one or more of the intermediate links having a portion inserted between the adjacent ends of intermediate links and formed with a notch to receive the out-turned ends of the rod or wire, thereby to keep the joint from spreading or opening when the belt is under strain, two or more of said links being relatively adjustable about a transverse axis to release one link from another.

3. A structure as specified in claim 1, said meeting ends of one alternate link normally engaging the next alternate link to retain the two links in connected relation.

4. A structure as specified in claim 2, one alternate link engaging the next alternate link to maintain the two links in connected relation.

5. A structure as specified in claim 1, each intermediate link having a pivotal connection with both of the alternate links connected thereto.

6. A structure as specified in claim 2, the links being formed to permit articulation at both ends of each alternate link.

Signed—

RAYMOND W. DULL.